United States Patent

Milligan

[15] 3,641,525

[45] Feb. 8, 1972

[54] SELF-CLOCKING FIVE BIT RECORD-PLAYBACK SYSTEM

[72] Inventor: Gene E. Milligan, Torrance, Calif.

[73] Assignee: The National Cash Register Company, Dayton, Ohio

[22] Filed: Aug. 17, 1970

[21] Appl. No.: 64,355

[52] U.S. Cl. ....................................................340/174.1 G

[51] Int. Cl. ....................................................G11b 5/06

[58] Field of Search .............340/174.1 G, 174.1 H, 174.1 A, 340/146.3 R; 346/74 M

[56] References Cited

UNITED STATES PATENTS

| | | | |
|---|---|---|---|
| 3,226,685 | 12/1965 | Potter et al. | 340/174.1 G |
| 3,274,611 | 9/1966 | Brown et al. | 340/174.1 G |
| 3,357,003 | 12/1967 | MacArthur | 340/174.1 H |
| 3,500,385 | 3/1970 | Padalino et al. | 340/174.1 H |

*Primary Examiner*—Bernard Konick
*Assistant Examiner*—Vincent P. Canney
*Attorney*—Louis A. Kline and Joseph R. Dwyer

[57] ABSTRACT

A magnetic recording and reproducing system wherein a parallel four-bit input code is converted into a five-bit character code and magnetically recorded. The code has a low redundancy when recorded with a magnetic state changing only for each zero bit. As a result, the magnetic recording has a high-bit density. Upon reading the magnetic recording, the zero-bit pulses are employed to synchronize a phase lock oscillator, enabling self-clocking as in the Manchester recording system. The recorded five-bit code is recovered by applying the read pulses and the phase lock oscillator output to logic circuits including flip-flops and gates. The five serial bit character is parallelized and decoded to recover the original five-bit code.

10 Claims, 3 Drawing Figures

| CHARACTER | I/O CODE | 5 DIGIT CODE |
|---|---|---|
| 0 | 0000 | 00000 |
| 1 | 0001 | 00001 |
| 2 | 0010 | 10000 |
| 3 | 0011 | 10001 |
| 4 | 0100 | 00100 |
| 5 | 0101 | 00101 |
| 6 | 0110 | 10100 |
| 7 | 0111 | 10101 |
| 8 | 1000 | 01000 |
| 9 | 1001 | 01001 |
| A | 1010 | 10010 |
| B | 1011 | 01010 |
| C | 1100 | 01100 |
| D | 1101 | 01101 |
| E | 1110 | 00010 |
| F | 1111 | 00110 |
| IDLE | - - - - | 10110 |

INVENTOR
GENE E. MILLIGAN

BY Louis A Kline
Joseph R Dwyer
HIS ATTORNEYS

INVENTOR
GENE E. MILLIGAN
Louis A Kline
BY Joseph Dwyer
HIS ATTORNEYS

SELF-CLOCKING FIVE BIT RECORD-PLAYBACK SYSTEM

BACKGROUND OF THE INVENTION

The present invention relates to a recording and reproducing system and more particularly to an improved digital recording and reproducing system for having high efficiency, a low bandwidth, and is self-clocking.

Normally, digital devices are provided with at least one storage device adapted to store a relatively large volume of digital information without modifying the information. Magnetic media such as tape, discs, cards, drums, etc., are commonly employed in connection with such storage devices. Digital information is recorded on the magnetic medium as either of two magnetic flux patterns which sequentially occur at discrete points. Normally, at least one of the flux patterns includes a magnetic flux change which may be either complete reversal of polarity or a change from one level of magnetization to a second level.

Because of timing variations between the equipment for recording and that for reproducing the digital information, speed variations of the media, flutter, etc., a clock pulse is normally employed to read data from the magnetic medium. The clock pulse may be recorded on a separate channel of the magnetic medium, or a continuously running clock pulse generator is synchronized by the pulses produced by the flux changes of the recorded digital information. In this way the clock pulses have the same timing variations as the recorded digital information.

For reasons of economy and efficiency, as many digits as can be reliably reproduced are recorded on a unit length of a magnetic medium. As will be apparent, it becomes more difficult to reliably reproduce digits as the digits are recorded closer together because of the electrical and mechanical limitations of the recording and reproducing system. One such limitation on storage density is that, as the storage density is increased, the number of flux patterns per unit length of magnetic medium is correspondingly increased, and hence, the number of flux changes per unit length is increased. A reproducing head has an output which is proportional to the rate of change of the flux of the magnetic medium. Therefore, each flux reversal is reproduced as a pulse by the reproducing head. As the storage density is increased, the distance between reproduced pulses is decreased. As a result, wavelength is reduced and the frequency of the reproduced signal is correspondingly increased. It is apparent that the bandwidth of reproducing amplifiers must be correspondingly increased.

Since the wavelength resolution of the reproducing system is limited, there is a limit to the number of flux changes per length of magnetic medium that can be reliably reproduced. Accordingly the density of flux changes is limited for a given recording and reproducing system. For maximum data storage density, the minimum possible number of flux changes is employed to represent the digital information.

Another limitation on the storage density is the increased possibility of not reproducing flux changes as the number of flux changes per length of medium is increased. This phenomenon is known as tape dropout error. Dropout error arises, for example, when the wavelength of the recorded pulses approaches the size of the airgap of the reproducing head. As the density of the flux changes is increased, the changes representing the digital information is increased.

In digital recording systems heretofore known to the art, digital information has been recorded on the magnetic medium by employing either the "return to zero" method, the "nonreturn to zero" method, or the phase shift or "Manchester" method.

In the return to zero method of recording digital information, one state of magnetization of the magnetic medium is assigned to the digit "1" and the opposite state is assigned to the digit "0." Ordinarily, the magnetic medium is maintained in one state of magnetization. It is pulsed to the opposite state and back again to the original state to record the occurrence of the digit "1." Hence, it is necessary to record two flux reversals for each unit digit. As the recorded pulses are packed closer together, adjacent pulses interfere with one another. It is necessary to leave a space between pulses which is large relative to the duration of the pulse. A given reproducing system can reliably read flux reversals which are further apart than a minimum distance. Consequently, the maximum number of digits per unit length of magnetic medium that can be recorded using the "return to zero" method, is relatively low.

In the conventional "nonreturn to zero" method of digital recording, no fixed state of magnetization is assigned to "1" or "0." Instead, the state of magnetization is reversed each time the digit "1" is recorded and is retained unchanged to indicate the recording of the digit "0." It is apparent, therefore, that one flux reversal is required for each occurrence of the digit "1" and no flux reversals are required for the digit "0." Therefore the number of digits per length that may be recorded by this recording method is large. However, major problems arise as the flux reversals are packed closer together. One of the major problems stems from the limited resolution of the reproducing system. Variations and spacing between flux reversals may cause the reproduced pulses to merge into one another, or to stretch over the "0" areas, where no pulse is to be reproduced. Another effect resulting from the limited resolution is that the reproduced signal is large when the spacing between flux reversals is wide and small where the spacing is close. Therefore, the "nonreturn to zero" method, because of the limited resolution of the reproducing system, results in difficulties in detecting the absence or presence of pulses as the number of digits recorded per unit length of magnetic medium is increased.

Another limitation on the maximum possible flux reversal density is due to the fact that the flux reversals occur at random depending on the composition of the digital information. As a result, the flux reversals are not sufficiently continuous to be employed to synchronize a clock pulse source. Therefore, a separate clock pulse channel must be recorded on the magnetic tape, the clock pulse being utilized to read the data channels.

In the "Manchester" or "phase-shift" method, the digit "1" is recorded as a single cycle of the square wave and the digit "0" is recorded as a single cycle of the square wave shifted 180° from the "1" square wave. It will be seen that flux reversal in one direction is employed to indicate the digit "1" and a flux reversal in the opposite direction is employed to indicate the digit "0." This method has the advantage that a flux reversal is provided for each digit whether it is a "0" or a "1." Therefore, the flux reversals may be employed to synchronize a clock pulse source. Errors, such as may be caused by tape skew, are eliminated.

However, the "Manchester" method has the disadvantage that when reading the flux reversals, it is necessary to sense the direction of flux reversals to determine whether a digit is a "1" or a "0." Therefore, information dropout always causes an error in this method. Another inherent disadvantage is that two flux reversals are sometimes necessary to record one digit of digital information.

Since there is a limit on the number of flux reversals that can be reliably reproduced, the maximum possible storage density is limited. The "Manchester" method is only 50 percent efficient, since a clock transition is recorded for each data transition. Because of the 50 percent efficiency of the "Manchester"-type recording, during reproduction a tolerance of only plus or minus 25 percent of the duration of a bit cell can be allowed for timing error.

SUMMARY OF THE INVENTION

In the present invention a recording and reproducing system is provided approaching the efficiency of "nonreturn to zero" while retaining the self-clocking and low bandwidth properties of "Manchester"-type recording. An additional bit is added to the four data bits in a four-digit binary code to provide a five binary digit code. Transitions in the magnetic state are recorded at the center of each bit cell representing "zero." On the other hand, there are no transitions of the magnetic state in the bit cell when "ones" are recorded. Means are provided for recording digital data whereby the data can be successfully recovered with a timing error of up to plus or minus 50 percent of a bit cell as recorded. Taking into account the 20 percent redundancy resulting from the use of the additional binary digit, a timing error of plus or minus 40 percent of each of the four binary digit data bit cells is permissible. System bandwidth is minimized, contributing to the minimizing of the timing error.

The five-digit code into which the four binary digit data is converted is arranged so that no more than two binary "ones" follow one another. Further implementing this rule, both the first and second binary digits cannot be "ones," nor can both the fourth and fifth binary digits be "ones." Each zero is recorded with a flux reversal, generating a recording pattern with three possible wavelengths between flux reversals for any combination of characters. It will be apparent, therefore, that reversals of the state of magnetization occur only 62½ percent as closely as are required with "Manchester"-type recording.

The present invention comprehends a recording circuit and a reproduction circuit operating in conjunction with a suitable magnetic recording medium such as tape or cards. The recording circuit, after conversion from the conventional four bit binary decimal code to a five-bit low redundancy code, serializes the code groups with the aid of a clock generator. The serialized five-bit code is applied to a flip-flop giving a square wave output, which is amplified and applied to a recording head, recording magnetic state transitions in accordance with the five-bit code on the magnetic medium.

The reproduction means forming part of the present invention includes a reproduction head cooperating with the magnetic medium to convert the recorded transitions into electrical signals, and a reproduction circuit for converting the recorded electrical signals from the reproduction head into the original four bit binary decimal code. The reproduction circuit includes a phase-locked oscillator connected to run in synchronism with the pulses from the reproduction head. Pulses from the reproduction head and from the phase-locked oscillator are applied to a plurality of gate circuits and flip-flops to recover the recorded five-bit code. The serial five-bit code data is converted to parallel form. A parallel decoder is provided to convert the five-bit code back to the original four-bit binary coded data supplied to the recording circuit.

It is, therefore, an object of this invention to provide a high-density, self-clocking, magnetic recording system.

Another object of this invention is to provide a magnetic recording system having low bandwidth requirements, together with high bit density.

Another object of this invention is to provide a magnetic recording system having increased timing tolerances.

Another object of the present invention is to provide a magnetic recording system wherein greater tolerances in the recorded signal positions are enabled.

Another object of this invention is to provide a highly efficient, simple, inexpensive digital magnetic recording and playback system.

BRIEF DESCRIPTION OF THE DRAWINGS

These and other objects and advantages of the present invention will become apparent by reference to the following description and accompanying drawings wherein.

DESCRIPTION OF PREFERRED EMBODIMENT

Figures 1, 2:
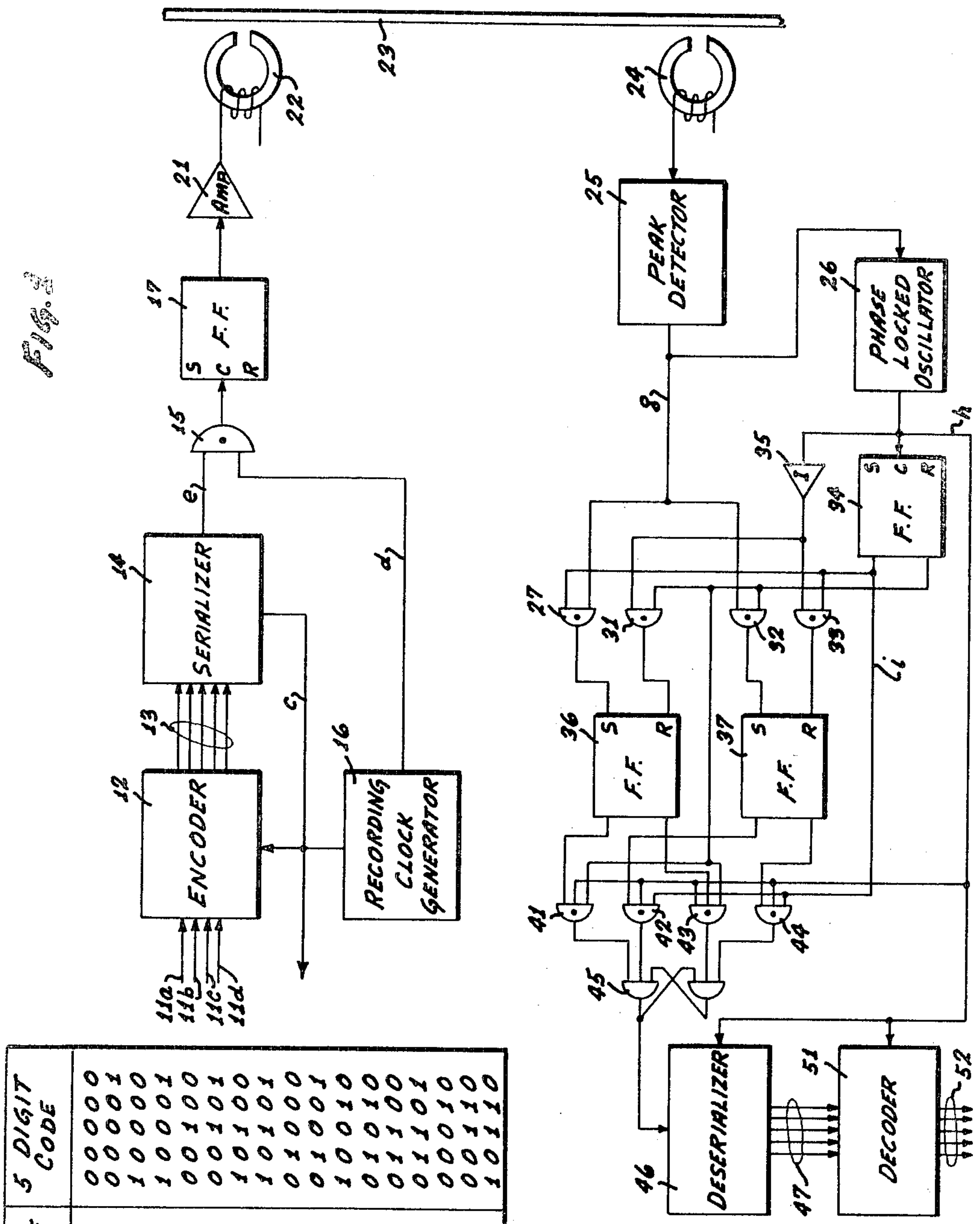
FIG. 1 is a block diagram of a digital recording and reproducing system in accordance with the present invention.
FIG. 2 is a code conversion table illustrating the rules for converting a four-digit binary code to the five-bit code employed in connection with the present invention; and, FIG. 3 illustrates various waveforms occurring in the operation of the system of FIG. 1.

Referring now to the drawings, and particularly to FIG. 1, information in the four-bit binary-decimal input-output code illustrated in FIG. 2 is applied to the recording circuit in parallel on the four input lines 11*a*, 11*b*, 11*c* and 11*d*. An encoder 12 accepts the four-bit input code and converts it to a five-bit illustrated in FIG. 2.

The five-bit code into which the four-bit binary decimal code is converted is a low redundancy code constructed in accordance with three rules: 1. No more than two "1's" can occur in succession to one another;

2. The first and second bits cannot both be binary "1's"; and,

3. The fourth and fifth bits cannot both be binary "1's."

There are 17 possible code combinations obeying these rules. Of these, 16 are employed to uniquely specify decimal numerals from 0–9, and six arbitrary alphabetical characters, illustrated in FIG. 2 as *a*, *b*, *c*, *d*, *e*, and *f*. The 17th combination is employed as an idle or synchronizing character.

The parallel five-bit code from encoder 12 is applied over cable 13 to a serializer 14. The parallel input is converted into a serial output by serializer 14. The serial five-bit code is applied to AND-gate 15. Clock pulses from a clock generator 16 are also applied to AND-gate 15.

Figure 3:
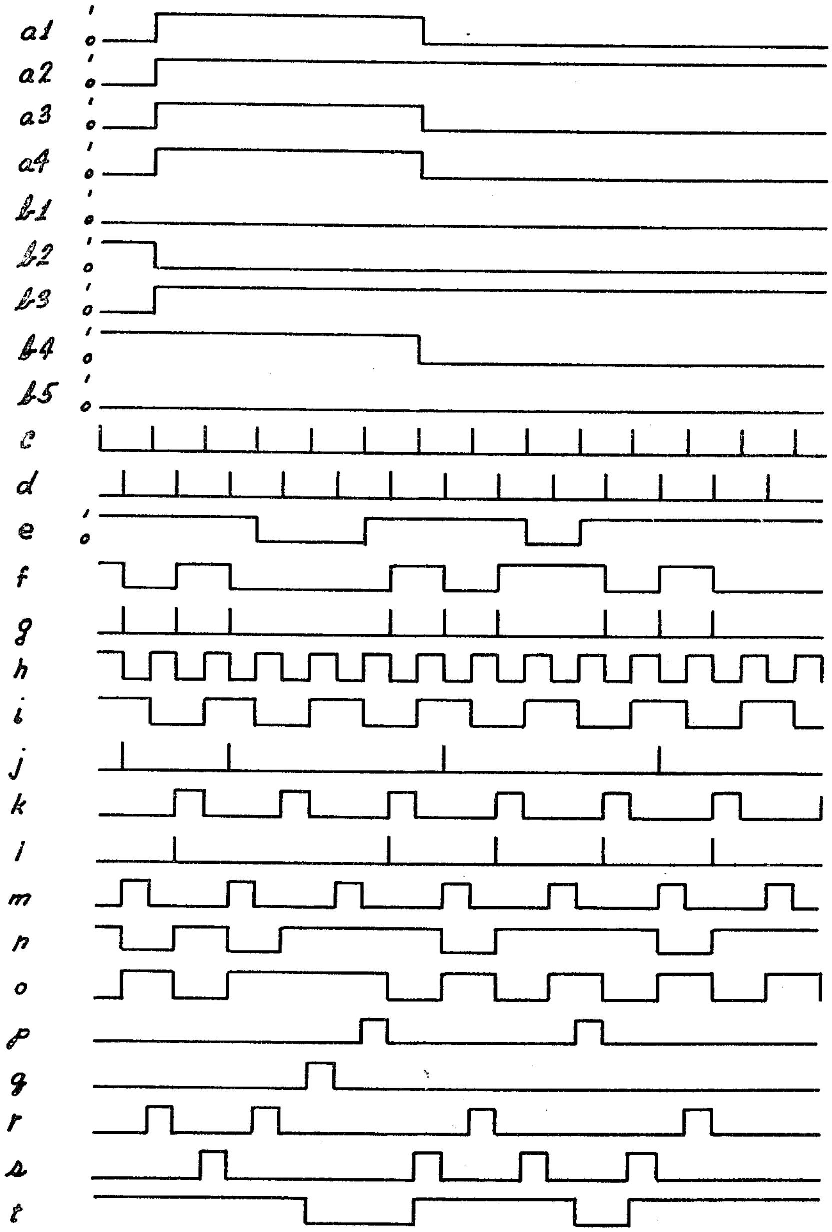

Clock generator 16 is connected to provide timing pulses to encoder 12, to serializer 14, and to AND-gate 15. The pulses applied to serializer 14 by clock generator 16 are of the same frequency as those applied to AND-gate 15, but are delayed in phase by a half-cycle, as illustrated by waveforms *c* and *d* in FIG. 3. The serialized data pulse train from serializer 14 in the five-bit code of FIG. 2, is illustrated in FIG. 3*e*. The pulse train from serializer 14 is applied to AND-gate 15, together with pulses from recording clock generator 16. Gate 15 transmits pulses from recording clock generator 16 in accordance with the serialized data in the five-bit code from serializer 14.

The code pulse train is applied to a flip-flop 17. Flip-flop 17 alternately sets and resets, as actuated by the data pulses coming from AND-gate 15. The rectangular wave output from flip-flop 17 is illustrated as FIG. 3*f*.

The resultant data bearing rectangular wave of FIG. 3*f* is applied to a magnetic recording head 22 through a suitable "-write" amplifier 21. Recording head 22 records the square wave of FIG. 3*f* on a magnetic medium 23.

The playback section of the present invention is illustrated in the lower portion of FIG. 1. A reading head 24, positioned in proximity to the moving record bearing magnetic medium 23, senses the changes in the magnetic field on the medium caused by the recording thereon of the waveform of FIG. 3*f*.

The resultant reversals of magnetization cause pulses to be induced in playback head 24, which are applied to a peak detector 25. Peak detector 25 senses the pulses from playback head 24 generated by the alternations of magnetization of the square wave in magnetic medium 23, and serves to effectively sharpen the pulses. The pulse output of peak detector 25 is illustrated at FIG. 3*g*. These pulses are applied to a phase lock oscillator 26, providing a synchronization signal to the oscillator. The frequency and phase relationship of the output of phase lock oscillator 26, illustrated as FIG. 3*h*, is constant in frequency and stable in phase. The pulse output from peak detector 25 is also applied to AND-gates 27 and 32. The output signal from phase lock oscillator 26 is applied directly flip-flop 34, and through inverter 35, to AND-gates 31 and 33. As will be further discussed hereinbelow, the output of phase lock oscillator 26 is also applied to another set of AND-gates, and to a deserializer.

The output signal from flip-flop 34 is a rectangular wave in the form illustrated at FIG. 3*i*, applied to AND-gates 27 and 33. The output waveform from AND-gates 27, 31, 32, and 33 are illustrated by FIGS. 3*j* to 3*m* respectively. The output pulses from AND-gate 27 are applied to the "set" terminal of flip-flop 36. The "reset" terminal of flip-flop 36 is connected to the output of AND-gate 31. Similarly, the "set" terminal of flip-flop 37 is connected to the output signal from AND-gate 32 and the "reset" terminal is connected to the output from AND-gate 33.

One output of flip-flop 36 is connected to an input terminal of AND-gate 41 and is illustrated by FIG. 3*n*. The other input terminals of AND-gate 41 are connected to an output of flip-flop 34 and to the output signal from phase lock oscillator 26.

AND-gate 42 is connected to the output of flip-flop 37. The waveform produced by flip-flop 37 is illustrated at FIG. 3*o*. AND-gate 42 is also connected to the output of phase lock oscillator 26, and to the other output of flip-flop 34. AND-gate 43, as well as AND-gate 44, are also connected to phase lock oscillator 26. In addition, AND-gate 43 is connected to flip-flop 36 and to flip-flop 34. AND-gate 44 similarly is connected to flip-flop 37 and flip-flop 34. The output waveforms from AND-gates 41, 42, 43, and 44 are illustrated by FIGS. 3*p*, 3*q*, 3*r*, and 3*s* respectively. AND-gates 41 and 42 are connected to one input of flip-flop 45, while AND-gates 43 and 44 are connected to the other input of flip-flop 45. The output signal from flip-flop 45, as illustrated at FIG. 3*t*, is representative of the output signal from serializer 14, and is the serial conversion of the data transmitted in the five-bit code. This signal is then applied to a deserializer 46, wherein the serial five-bit code is converted to parallel form and applied over lines 47 to decoder 51. Decoder 51 serves to reconvert the five-bit binary code to the four-bit binary-decimal input-output code, which is transmitted in parallel over the output lines 52 to a suitable utilization device such as a digital computer.

Phase-locked oscillator 26 alternately conditions AND-gates 27 and 33 or 32 and 31 through flip-flop 34. A recorded pulse reproducing a binary "0" sensed by reproducing head 24 will thus "set" either of flip-flops 36 or 37 alternately. The lack of a pulse representing a binary "1" maintains flip-flops 36 and 37 in their "reset" condition, and if previously "set," restores them to "reset."

Gates 41, 42, 43 and 44 combine the outputs from flip-flops 36 and 37, phase-locked oscillator 26 and flip-flop 12 enable combining the binary signals from the alternate flip-flops 36 and 37. Since the duty cycle of the logic elements is halved due to the alternating arrangement, the pulse timing is not critical, and may vary within half the length of time flip-flop 34 provides a positive output. Tolerance of pulse position in each cell on the recording tape is such that a pulse appearing substantially anywhere within the entire cell width is accurately handled. Further assurance of accuracy is provided in that the logic elements not being employed at a given time act as checks on the accuracy of the logic elements actually operating.

What is claimed is:

1. A system for magnetically recording and reproducing digital data comprising:
- an encoder for converting a four-bit binary code to a five-bit binary code allowing combination of two successive bits only as like binary digits;
- a recording medium;
- recording means connected to said encoder for recording digital data in said five-bit binary code on said recording medium, whereby the polarity of said recording medium is reversed to record only one of a pair of binary digits;
- playback means for sensing said reversals of polarity of said recording medium and generating pulses in response thereto;
- an oscillator connected to said playback means effective to generate a wave having a frequency determined by said pulses;
- and logic means connected to said playback means and to said oscillator for recovering said digital data.

2. A digital recording and reproducing system comprising:
- means for supplying binary input data with alphanumeric characters represented by a four-bit code;
- first code conversion means effective to convert said four-bit code into a low redundancy five-bit code comprising combinations of binary digits wherein no more than two similar selected binary digits occur in succession;
- magnetic recording means for recording said selected binary digits as a magnetic state reversal on a magnetic medium;
- reproducing means detecting said magnetic state reversals on said magnetic medium as electrical pulses;
- oscillator means having a frequency determined by said electrical pulses;
- logic means combining said pulses and the output of said oscillator means to reproduce said five-bit code; and
- second code conversion means effective to convert said five-bit binary code to said four-bit binary code.

3. In the recording and reproducing system of claim 2, each of said binary digits occupying a cell space on said magnetic medium.

4. In the recording and reproducing system of claim 3, said reproducing means including a peak detector connected to a magnetic playback head.

5. In the recording and reproducing system of claim 4, said oscillator means including a phase-locked oscillator driven by said electrical pulses and generating output pulses having a frequency and phase relationship determined by pulses detected by said reproducing means.

6. In the recording and reproducing system of claim 5, said logic means including:
- first and second gate means alternately conditioned by means responsive to said phase-locked oscillator and responsive to said reproducing means; and
- first and second means responsive to said first and second gate means for responding to alternate digit cell spaces.

7. In the recording and reproducing system of claim 6, said first and second means including:
- a first flip-flop connected to said first gate means and a second flip-flop connected to said second gate means;
- third gate means responsive to said first and second flip-flops and to said phase locked oscillator for recombining said reproduced pulses into said five-bit code.

8. In the recording and reproducing system of claim 7, a deserializer connected to said third gate means for converting said five-bit code to parallel form, to enable said decoder means to convert said five-bit code into said four-bit code.

9. A system for magnetically recording and reproducing digital data comprising:
- an encoder translating digital data from a four-bit binary code to a five-bit binary code wherein only two successive bits may both be binary ones;
- circuit means connected to said encoder effective to provide signals successively alternating in polarity upon occurrence of a preselected one of said binary digits in said five-bit binary code;
- recording means connected to said circuit means for recording said signal alternating in polarity in said five-bit binary code on said recording medium;
- reproducing means cooperating with said recording medium for sensing said signals alternating in polarity in said five-bit binary code;
- oscillator means connected to said reproducing means for generating a signal synchronized to said signals alternating in polarity; and
- logic means in circuit with said reproducing means and said oscillator means for translating said five-bit binary code to recover said data in said four-bit binary code.

10. The method of magnetically recording and reproducing digital data on a magnetic recording medium comprising:
- providing digital data in a four-bit binary code;
- converting said digital data from said four-bit binary code to a five-bit binary code wherein only two successive bits can be the same;
- serially recording said digital data in said five-bit binary code on a magnetic medium with the state of magnetization reversed each time a first digit is recorded, and allowed to remain in the state previously recorded each time a second digit is recorded;
- sensing said magnetic medium to detect said reversals of state of magnetization as pulses;

driving a phase locked oscillator with said pulses to provide a square wave having a frequency and phase relationship determined by said pulses;

combining said square wave with said pulses to recover said digital data in said five-bit binary code; and converting said five-bit binary code into said four-bit binary code.

* * * * *